(12) United States Patent
Moriyama et al.

(10) Patent No.: US 8,068,198 B2
(45) Date of Patent: Nov. 29, 2011

(54) LIQUID CRYSTAL DISPLAY APPARATUS COMPRISING A LIGHT-DETECTING AND CONTROLING UNIT THAT SENSE AND CONTROL THE BRIGHTNESS OF THE DISPLAY

(75) Inventors: Yuichiro Moriyama, Tottori (JP); Takashi Kunimori, Tottori (JP)

(73) Assignee: Sony Corporation, Tokyo (JP)

( * ) Notice: Subject to any disclaimer, the term of this patent is extended or adjusted under 35 U.S.C. 154(b) by 470 days.

(21) Appl. No.: 12/361,597

(22) Filed: Jan. 29, 2009

(65) Prior Publication Data
US 2009/0207352 A1   Aug. 20, 2009

(30) Foreign Application Priority Data
Feb. 18, 2008   (JP) ................................. 2008-035955

(51) Int. Cl.
*G02F 1/133* (2006.01)
*G02F 1/1335* (2006.01)
*G02F 1/1343* (2006.01)
(52) U.S. Cl. ........ 349/116; 349/106; 349/139; 349/141; 345/102; 348/300
(58) Field of Classification Search .................. 349/116; 345/102; 348/300
See application file for complete search history.

(56) References Cited

U.S. PATENT DOCUMENTS

| 2008/0319695 A1* | 12/2008 | Ishii et al. | 702/86 |
| 2009/0086137 A1* | 4/2009 | Horiguchi et al. | 349/116 |
| 2009/0180012 A1* | 7/2009 | Ino | 348/300 |

FOREIGN PATENT DOCUMENTS

| JP | 2005-203783 | 7/2005 |
| JP | 2006-215302 | 8/2006 |
| JP | 2007-140106 | 6/2007 |
| JP | 2007-279100 | 10/2007 |

\* cited by examiner

*Primary Examiner* — Huyen Ngo
(74) *Attorney, Agent, or Firm* — K&L Gates LLP

(57) ABSTRACT

A liquid crystal display includes: a display with an array substrate having scanning and data lines and an IC chip driving liquid crystal, and a color filter substrate; a light-detector having an optical sensor integrated in the display detecting external light; a detection circuit connected via sensor laid-around lines connecting to light-detector lines; an illuminator illuminating the display panel; and a controller controlling the illuminator based on the detection circuit's output. The data lines are distributed to the chip-mounting area and have terminals at an end for connecting to IC chip bump terminals. Leader lines distribute from the terminals toward the chip-mounting area and have inspection terminals at their ends. Sensor inspection lines connect at one end to the sensor laid-around lines and extend at the other end to the chip-mounting area. Sensor detection terminals are formed at the other end of the sensor inspection lines.

4 Claims, 6 Drawing Sheets

LIQUID CRYSTAL DISPLAY APPARATUS COMPRISING A LIGHT-DETECTING AND CONTROLING UNIT THAT SENSE AND CONTROL THE BRIGHTNESS OF THE DISPLAY

BACKGROUND

1. Technical Field

The present invention relates to a liquid crystal display apparatus. More specifically, the invention relates to a liquid crystal display apparatus which includes a light-detecting unit that senses an environmental light, controls the brightness of an illuminating unit automatically according to the intensity of the environmental light detected by the light-detecting unit, and achieves an easy inspection of optical-sensor characteristics.

2. Related Art

Application of liquid crystal display apparatuses is rapidly spread not only in recent information communication apparatuses, but also in general electric apparatuses. Since a liquid crystal display panel does not emit light by itself, a transmissive liquid crystal display apparatus having a backlight as an illuminating unit combined thereto is used in most cases. However, in the liquid crystal display apparatuses as described above, specifically, in the case of the liquid crystal display apparatuses that are used in compact mobile information terminals represented by mobile phones or the like, reflective liquid crystal display apparatuses which do not require the backlight are used in most cases in order to reduce power consumption. However, since an environmental light is used as the illuminating unit in the reflective liquid crystal display apparatus, visibility is deteriorated in a dark room or the like. Therefore, reflective liquid crystal display apparatuses using a front light as the illuminating unit and transflective liquid crystal display apparatuses which have both transmissivity and reflexivity are being developed.

The transflective liquid crystal display apparatus is able to display an image using a transmissive portion of a pixel area by illuminating the backlight as the illuminating unit in a dark place and display the image using the environmental light by a reflective portion without illuminating the backlight or the like in a bright place. Therefore, in the transflective liquid crystal display apparatus, constant illumination of the illuminating unit such as the backlight is not necessary, and hence an advantage of significant reduction of the power consumption is achieved.

The transmissive liquid crystal display apparatus is characterized in that the image can be recognized clearly even when the brightness of the backlight is reduced in the dark place, while the image cannot be viewed easily unless the brightness of the backlight is increased in the bright place.

As described above, the liquid crystal displays of the liquid crystal display apparatuses have different visibilities depending on the intensity of the environmental light. Therefore, the invention in which a light detector is provided in the liquid crystal display apparatus to detect the brightness of the environmental light thereby, and control the brightness of the illuminating unit on the basis of a result detected by the light detectors is known (see JP-A-2005-203783).

According to the display apparatus disclosed in JP-A-2005-203783, by the provision of optical sensors in the display apparatus, control of the illuminating unit on the basis of outputs from the optical sensors is achieved. In the display apparatus described above, the optical sensors are formed on, for example, a peripheral area on a liquid crystal display panel assembly (array substrate). Lines used for the optical sensors arranged in the peripheral area are laid around in different areas since input/output signals are completely different from lines provided for driving the liquid crystal. However, the lines laid around the different area from the lines for driving the liquid crystal also have a possibility of defective wirings such as a disconnection or a short-circuit with other lines which are present in the vicinity thereof as in the case of the lines for driving the liquid crystal, an inspection is needed in the course of manufacture.

The applicant of the invention proposes a liquid crystal display panel which is disclosed in JP-A-2006-215302 in order to improve the workability of the inspection of the lines in the course of manufacture, that is, an intermediate functional inspection. The liquid crystal display panel in this disclosure is adapted to allow the intermediate functional inspection to be carried out by extending leader lines from various lines connected to an IC chip, for example, from ends of data lines, forming terminals for inspection at ends of the leader lines, and forming the terminals for inspection at a predetermined matrix, thereby bringing inspection probes formed of a pin or conductive rubber into contact with the terminals for inspection. However, in the liquid crystal display panel in which the workability is improved, when the optical sensor provided in the display apparatus disclosed in JP-A-2005-203783 is provided, the various lines for driving the liquid crystal and the lines connected to the optical sensors are laid at different positions, and hence such the intermediate functional inspection for these lines must be carried out in different processes. Therefore, there arises a problem of increase in inspection time and the cost thereof for the intermediate functional inspection.

SUMMARY

An advantage of some aspects of the invention is that there is provided a liquid crystal display apparatus having a light-detecting unit which allows an intermediate functional inspection of not only lines for driving liquid crystal, but also lines connected to the light-detecting unit to be carried out easily.

A liquid crystal display apparatus in the invention includes: a liquid crystal display panel having an array substrate having a plurality of scanning lines and data lines arranged in a matrix pattern and a chip-mounting area on which an IC chip for driving liquid crystal is provided and a color filter substrate having a color filter layer provided thereon; a light-detecting unit having an optical sensor integrated in the liquid crystal display panel for detecting external light; a detection circuit connected via sensor laid-around lines connected respectively to a plurality of lines of the light-detecting unit; an illuminating unit that illuminates the liquid crystal display panel; and a control unit that controls the brightness of the illuminating unit on the basis of an output from the detection circuit; in which at least the plurality of data lines on the array substrate are distributed to the chip-mounting area and are formed with terminals for bump terminals to be connected to bump terminals of the IC chip at an end thereof, leader lines are further distributed from the plurality of terminals to be connected to the bump terminals toward the chip-mounting area and are formed with inspection terminals at ends thereof, a plurality of sensor inspection lines each connected at one end thereof to each of the plurality of sensor laid-around lines and extended at the other end thereof to the chip-mounting area are formed, and the sensor inspection lines are each formed at the other end thereof with a sensor detection terminal.

In this configuration, since the sensor laid-around lines connected to the light-detecting unit are extended by the sensor inspection lines to the chip-mounting area, and the sensor inspection terminals are provided at distal ends of the sensor inspection lines, the inspection terminals for the respective lines for driving the liquid crystal and the sensor inspection terminals are provided together at one place, so that the intermediate functional inspection is easily carried out. Therefore, inspection of both the lines for driving the liquid crystal and the lines of the light-detecting unit is achieved in less number of processes by the intermediate functional inspection, and hence an event such that the expensive IC chip is mounted to a defective product is avoided, so that the liquid crystal display apparatus is provided at a high yielding percentage.

Preferably, the color filter layer formed on the color filter substrate includes a plurality of colors which are provided separately along the data lines, and the plurality of inspection terminals are arranged in a plurality of columns so as to be positioned in different columns by colors corresponding thereto, and the sensor inspection terminals formed at the other ends of the plurality of sensor inspection lines are disposed in the separate columns respectively.

In this configuration, by disposing the inspection terminals in different columns different by colors, and disposing the sensor inspection lines in different columns, different voltages can be applied easily to the sensor inspection lines in the intermediate functional inspection, so that the liquid crystal display apparatus having a high workability in the intermediate functional inspection is provided.

Preferably, the optical sensor in the light-detecting unit is a TFT optical sensor formed of a thin film transistor.

In this configuration, by forming the optical sensor of the light-detecting unit with the TFT, it can be formed simultaneously in the same manufacturing process as that for the TFT used in general as a switch element in the liquid crystal display apparatus, so that reduction of the number of processes is achieved.

Preferably, a plurality of the TFT optical sensors are provided and include first and second TFT optical sensors which detect lights in different systems.

In this configuration, by providing the plurality of TFT optical sensors and driving the plurality of TFT as the first and second optical sensors which detect the lights in different systems respectively, accurate detection of an environmental light is achieved and control depending on the visibility of a user is enabled.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
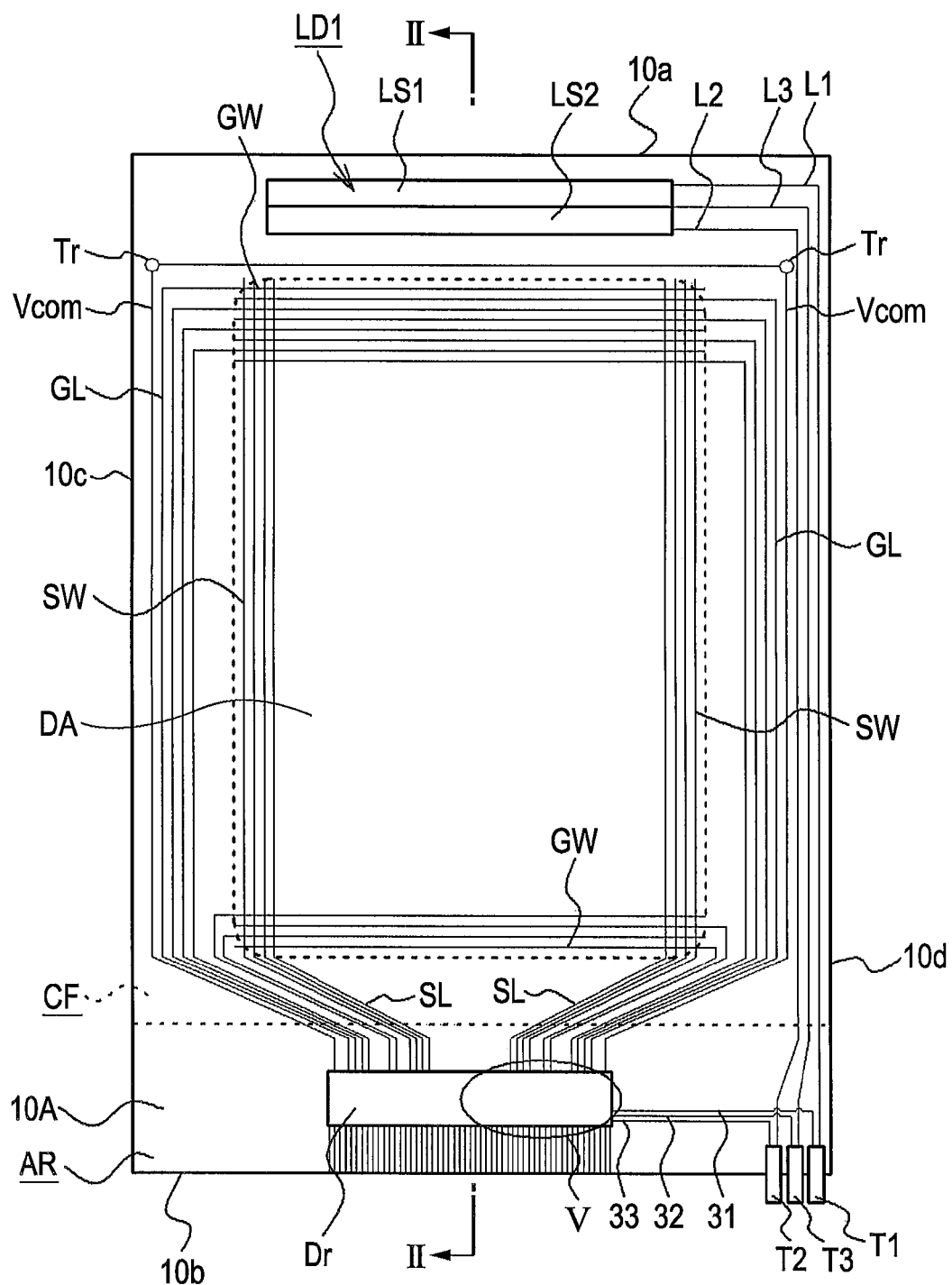
FIG. 1 is a plan view schematically showing an array substrate viewed through a color filter substrate of a liquid crystal display apparatus according to an embodiment of the invention.

Referring now to the drawings, best mode of the invention will be described. However, the embodiments shown below are intended only to illustrate a liquid crystal display apparatus for embodying a technical idea of the invention, and are not intended to limit the invention to the liquid crystal display apparatus described here, and other modes included in claims are also applicable.

Figure 2:
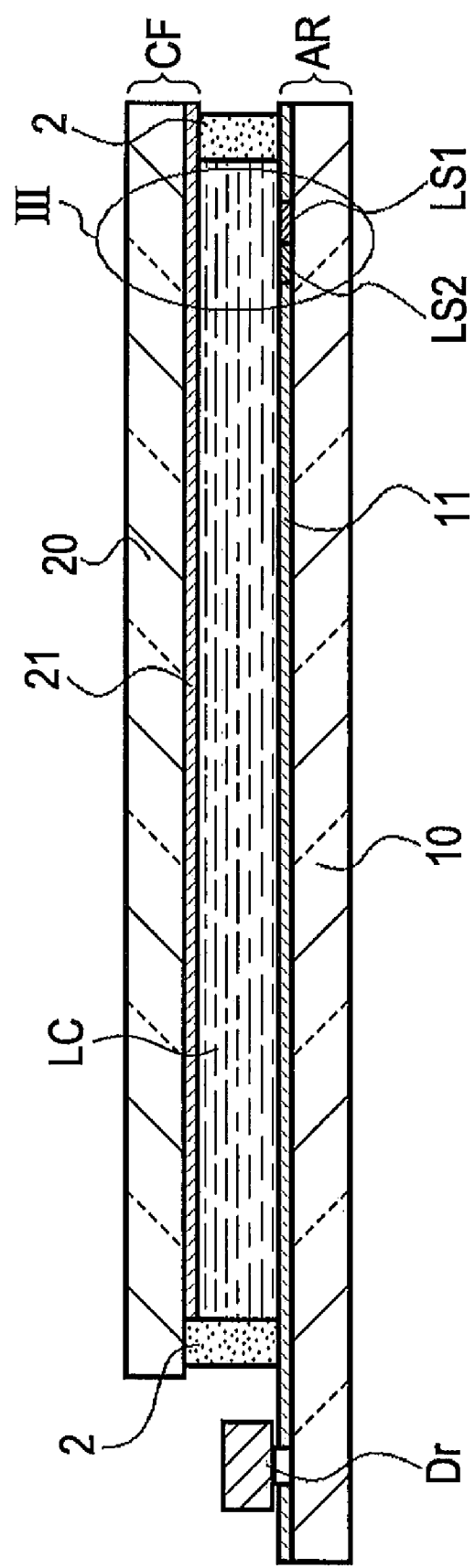
FIG. 2 is a schematic cross-sectional view taken along the line II-II in FIG. 1.
Figure 3:
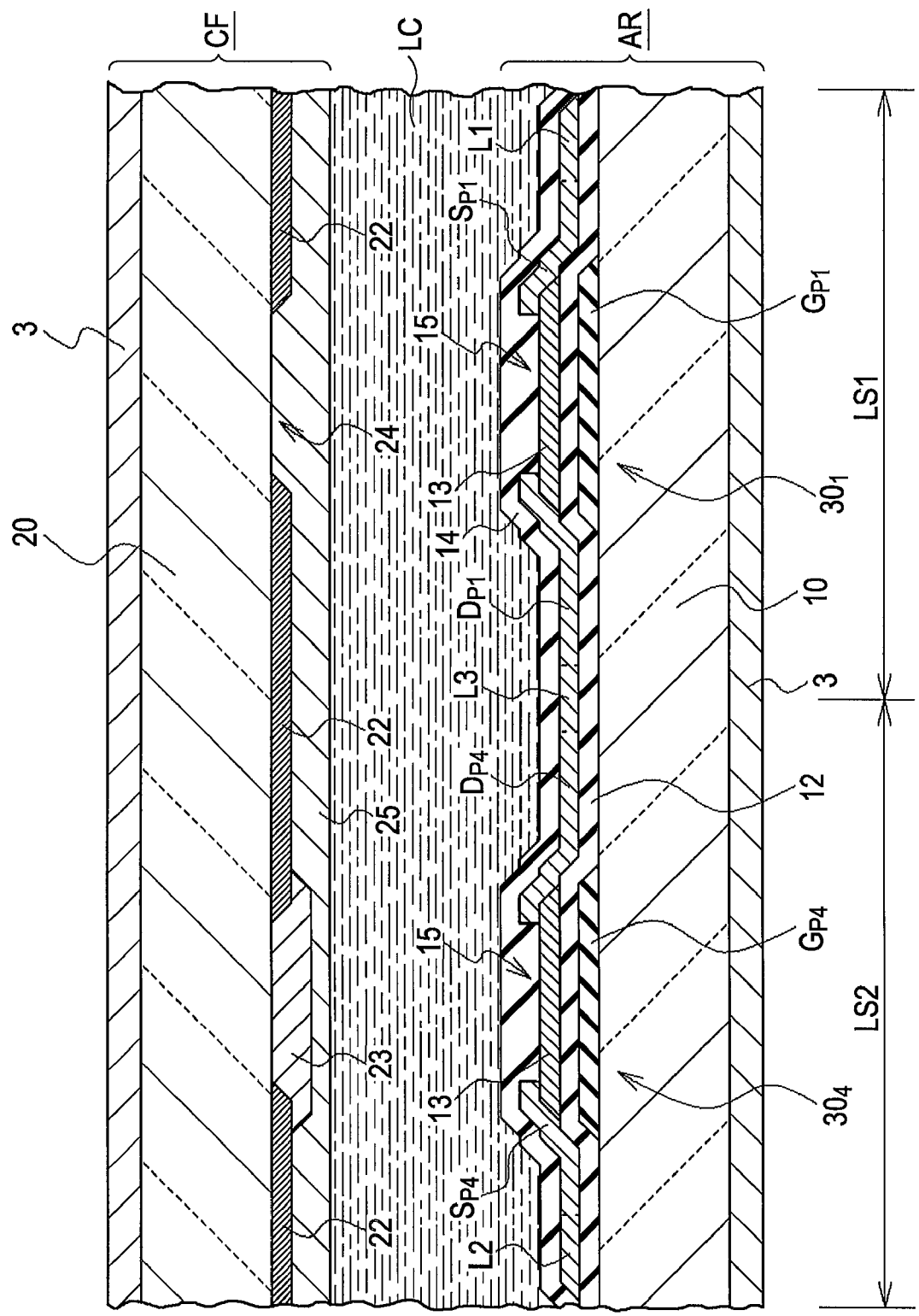
FIG. 3 is an enlarged cross-sectional view showing a portion III in FIG. 2 in an enlarged scale.
Figure 4:
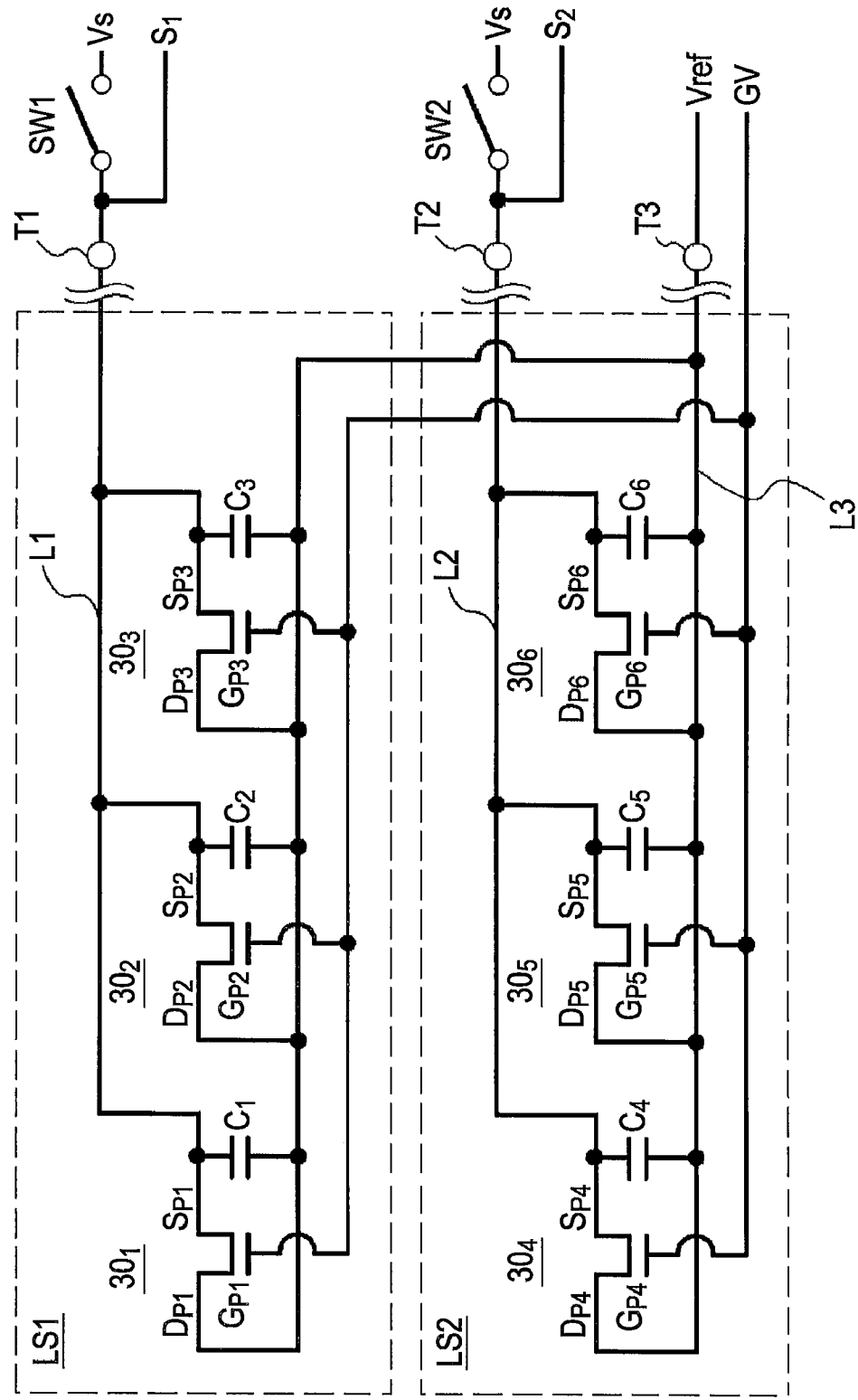
FIG. 4 is an equivalent circuit diagram of a light-detecting unit.
Figure 5:
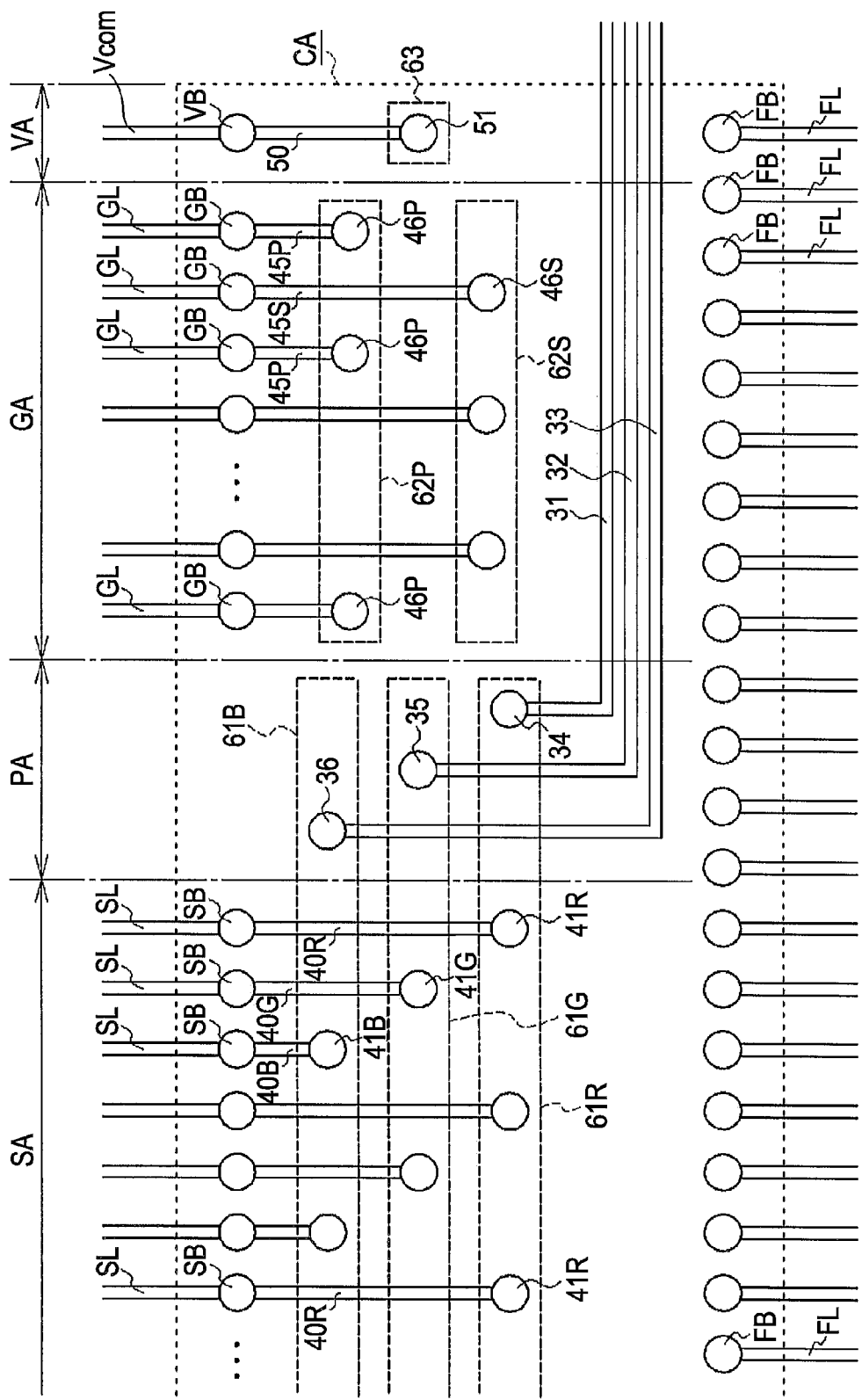
FIG. 5 is an enlarged view of a portion V in a state in which a driver is removed in FIG. 1.
Figure 6:
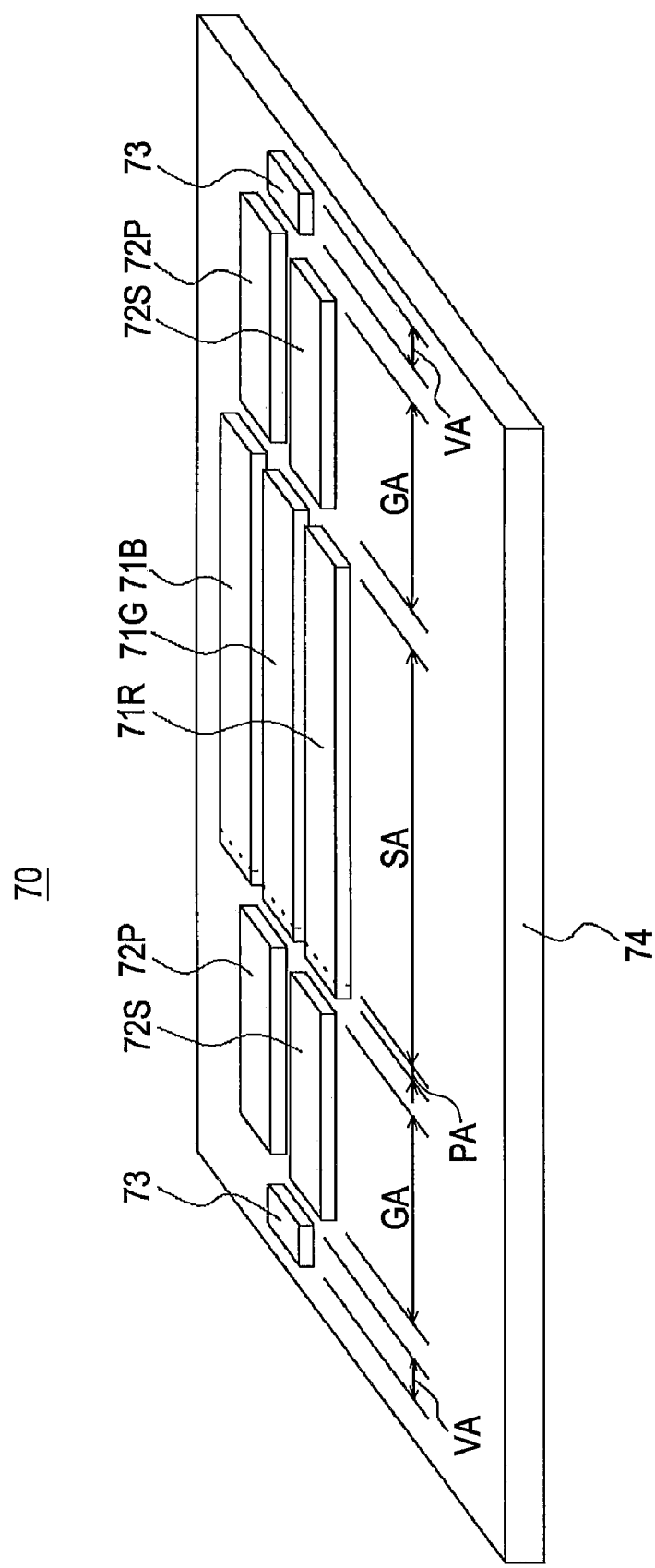
FIG. 6 is a perspective view showing an inspection jig which is to be brought into contact with respective inspection terminals.

FIG. 1 is a plan view schematically showing an array substrate viewed through a color filter substrate of a liquid crystal display apparatus according to an embodiment of the invention. FIG. 2 is a schematic cross-sectional view taken along the line II-II in FIG. 1. FIG. 3 is an enlarged cross-sectional view showing a portion III in FIG. 2 in an enlarged scale. FIG. 4 is an equivalent circuit diagram of a light-detecting unit. FIG. 5 is an enlarged view of a portion V in a state in which a driver is removed in FIG. 1. FIG. 6 is a perspective view showing an inspection jig which is to be brought into contact with respective inspection terminals.

A liquid crystal display apparatus 1 in an embodiment is, as shown in FIG. 1, a transmissive or a transflective liquid crystal display apparatus driven in a TN (Twisted Nematic) mode or a VA (Vertical Alignment) mode, including an array substrate AR having various lines arranged on a transparent plate 10 formed of a rectangular transparent insulating material, for example, a glass plate, and a color filter substrate CF having various lines arranged on a transparent substrate 20 formed of a rectangular transparent insulating material arranged so as to oppose the transparent substrate of the array substrate AR. The transparent plate 10 of the array substrate AR is larger in size than the transparent substrate 20 of the color filter substrate CF so as to form a protruded portion 10A having a predetermined space when being arranged so as to oppose the transparent substrate 20 of the color filter substrate CF, and a seal member 2 is adhered to outer peripheries of the array substrate AR and the color filter substrate CF, so that liquid crystal LC and a spacer (not shown) for adjusting a cell gap are encapsulated. On outer surfaces of the array substrate AR and the color filter substrate CF, there are provided polarizing plates 3 respectively (see FIG. 3).

The array substrate AR includes short sides 10a and 10b and long sides 10c and 10d respectively opposed to each other, and on the side of one of the short sides 10b corresponds to the protruded portion 10A, and a chip-mounting area CA provided on the protruded portion 10A (see FIG. 5) is provided with an IC chip Dr for a source driver and a gate driver, and the other short side 10a side includes a light-detecting unit LD1. On the back side of the array substrate AR, there is provided a backlight (not shown) as an illuminating unit. The backlight is controlled by an eternal control circuit (control unit), not shown, on the basis of an output from the light-detecting unit LD1.

An opposed surface of the array substrate AR, that is, the surface which comes into contact with a liquid crystal LC is provided with a plurality of scanning lines GW extending in the row direction of (lateral direction in FIG. 1) and being arranged at a predetermined distance from each other and a plurality of data lines SW extending in the column direction (vertical direction in FIG. 1) so as to be insulated from the scanning lines GW and being arranged at a predetermined distance from each other. The data lines SW and the scanning lines GW are wired in a matrix pattern, and a switch element which is turned ON by scanning signals from the scanning lines GW and a pixel electrode which receives a supply of video signals from the data lines SW via the switch element are formed in each area surrounded by the scanning lines GW and the data lines SW intersecting to each other. In FIG. 2, the scanning lines GW, the data lines SW, the switch element, and the pixel electrode are illustrated collectively as a first structure 11.

The areas surrounded by the scanning lines GW and the data lines SW constitute pixels and an area in which the pixels are formed corresponds to a display area DA. A thin film transistor (TFT), for example, is used as the switch element.

The respective scanning lines GW and the respective data lines SW are extended respectively to the outside of the display area DA, that is, are extended to a frame area, and are connected to gate laid-around lines GL and source laid-around lines SL, respectively. Then, the gate laid-around lines GL and the source laid-around lines SL are laid around a peripheral area out of the display area DA and are connected to the IC chip Dr. In addition, on the outside of the gate laid-around lines GL, a common line Vcom is arranged so as to surround the display area DA. An end of the common line Vcom is connected to the IC chip Dr like the gate laid-around lines GL and the source laid-around lines SL, and the common line Vcom is electrically connected to a common line (not shown) provided on the color filter substrate CF via transfer electrodes Tr provided at corners of the array substrate AR.

Sensor laid-around lines L1 to L3 distributed from first and second TFT optical sensors LS1 and LS2 of the light-detecting unit LD1, described later, are laid around on the side of one of the long sides 10d of the array substrate AR and are connected to terminals T1 to T3. The external control circuit is connected to the respective terminals T1 to T3, and a reference voltage is supplied from the external control circuit to the light-detecting unit LD1, so that the output from the light-detecting unit LD1 is delivered. A configuration of the light-detecting unit LD1 will be described later in detail.

An opposed surface of the color filter substrate CF, that is, the surface thereof which comes into contact with the liquid crystal LC is formed with a light-shielding layer 22 (see FIG. 3) so as to cover the scanning lines GW, the data lines SW, the switch element, and the frame area, and the area in the display area DA which is surrounded by the light-shielding layer 22 is formed with a color filter layer 23 (see FIG. 3) of a plurality of colors, that is, R(red), G(green), and B(blue), and a protection film 25 (see FIG. 3) formed of a transparent material so as to cover the color filter layer 23 and other members. A surface of the protection film 25 in the display area DA is provided with a common line (not shown) connected to the common line Vcom via the transfer electrodes Tr. The respective components are collectively illustrated as a second structure 21 in FIG. 2. The color filter layer 23 described above is formed into a stripe pattern along the direction of extension of the data lines SW on the array substrate AR by colors.

Subsequently, referring to FIG. 3 and FIG. 4, the configuration of the light-detecting unit LD1 will be described. In FIG. 4, total six of optical sensors $30_1$ to $30_6$ are illustrated. However, the number of the optical sensors $30_1$ to $30_6$ is not limited to six, and may be changed as long as it is two or more.

The light-detecting unit LD1 includes the first TFT optical sensor LS1 and the second TFT optical sensor LS2 as shown in FIG. 1 and FIG. 4. The first and second TFT optical sensors LS1 and LS2 include the plurality of (three in FIG. 4) optical sensors $30_1$ to $30_3$ and optical sensors $30_4$ to $30_6$, respectively. Then the optical sensors $30_1$ to $30_3$ which constitute the first TFT optical sensor LS1 and the optical sensors $30_4$ to $30_6$ which constitute the second TFT optical sensor LS2 are each arranged in a line adjacently to each other, and the first TFT optical sensor LS1 and the second TFT optical sensor LS2 are arranged in parallel to each other.

A circuit configuration of the plurality of optical sensors $30_1$ to $30_6$ which constitute the first and second TFT optical sensors LS1 and LS2 is such that capacitors $C_1$ to $C_6$ are connected in parallel between drain electrodes $D_{P1}$ to $D_{P6}$ and the source electrodes $S_{P1}$ to $S_{P6}$ respectively, the terminals of the source electrodes $S_{P1}$ to $S_{P6}$ and the capacitors $C_1$ to $C_6$ on one side are connected to the terminals T1 and T2 via the laid-around lines L1 and L2, and the terminals T1 and T2 are connected to a first reference voltage Vs (for example, +2V) via switch elements SW1 and SW2 as shown in FIG. 4. Furthermore, The drain electrodes $D_{P1}$ to $D_{P6}$ of the optical sensors $30_1$ to $30_6$ and the other terminals of the capacitors $C_1$ to $C_6$ are connected to the terminal T3 via the single laid-around line L3, and a second reference voltage Vref which supplies a predetermined direct voltage is connected to the terminal T3. Output liens are connected to the terminals T1 and T2, and predetermined output voltages $S_1$ and $S_2$ are outputted to the output liens. Still further, gate electrodes $G_{P1}$ to $G_{P6}$ of the optical sensors $30_1$ to $30_6$ are connected to a predetermined voltage supply source, not shown, via the laid-around lines, so that a predetermined voltage GV (for example, −10V) is supplied thereto. The terminal T3 here is connected to the second reference voltage Vref, the invention is not limited thereto, and the terminal T3 may be grounded, for example. In FIG. 4, the configuration in which the optical sensors $30_1$ to $30_6$ are provided for the respective capacitors $C_1$ to $C_6$ has been described. However, the invention is not limited thereto and, for example, a single capacitor of a relatively large capacity may be provided for the first and second TFT optical sensors LS1 and LS2, respectively.

The output voltage detected in this manner is used in a detection circuit, not shown, for detecting the intensity of an environmental light and, on the basis of the intensity of the detected environmental light, the backlight is controlled by the external control circuit. The detection circuit in this case is configured to convert the voltage into an analogue output voltage by a known sampling hold circuit synchronized with ON and OFF of the switch elements SW1 and SW2, convert the analogue output voltage into a digital voltage by an A/D converter, and calculate in digital.

A wiring configuration of the optical sensor $30_1$ and the optical sensor $30_4$ from among the optical sensors $30_1$ to $30_6$ which constitute the first and second TFT optical sensors LS1 and LS2 having the circuit configuration as described above will be described.

The optical sensor $30_1$ which constitutes the first TFT optical sensor LS1 is formed by forming the gate electrode $G_{P1}$ first, and forming a gate insulating film 12 formed of a transparent insulating material so as to cover on the gate electrode $G_{P1}$ as shown in FIG. 3. Then, a semiconductor layer 13 which is formed of amorphous silicon or polycrystal silicon and serves as a light-receiving device for the environmental light is formed on the gate insulating film 12. On the semiconductor layer 13, the source electrode $S_{P1}$ is formed so as to be partly superimposed on the semiconductor layer 13 from one side of the semiconductor layer 13. Simultaneously, the drain electrode $D_{P1}$ is formed so as to partly be partly superimposed on the semiconductor layer 13 from the other side of the semiconductor layer 13. Then, a protection insulating film 14 is formed further on the source electrode $S_{P1}$ and the drain electrode $D_{P1}$. Then, an area of the semiconductor layer 13 of the optical sensor $30_1$ configured described above where the source electrode $S_{P1}$ and the drain electrode $D_{P1}$ are not superimposed forms a channel area 15 which is a light-receiving portion.

In the optical sensor $30_1$, the light-shielding layer 22 of an area of the color filter substrate CF which opposes the channel area 15 is removed and, instead, only a flattening film 25 is disposed, so that a window portion 24 is formed. Then, since the window portion 24 transmits the environmental light therethrough, light-receiving by the channel area 15 is achieved. Since the periphery of the window portion 24 is light-shielded by the light-shielding layer 22, the channel area 15 is rarely irradiated with the reflective light from the backlight, so that only the environmental light is received accurately.

The optical sensor $30_4$ which constitutes the second TFT optical sensor LS2 is formed by forming the gate insulating film 12 formed of the transparent insulating material so as to cover on the gate electrode $G_{P4}$ as shown in FIG. 3. Then, the semiconductor layer 13 which is formed of amorphous silicon or polycrystal silicon and serves as the light-receiving device for the environmental light is formed on the gate insulating film 12. On the semiconductor layer 13, the source electrode $S_{P4}$ is formed so as to be partly superimposed on the semiconductor layer 13 from one side of the semiconductor layer 13. Simultaneously, the drain electrode $D_{P1}$ is formed so as to be partly superimposed on the semiconductor layer 13 from the other side of the semiconductor layer 13. Then, the protection insulating film 14 is formed further on the source electrode $S_{P4}$ and the drain electrode $D_{P4}$. Then, an area of the semiconductor layer 13 of the optical sensor $30_4$ configured described above where the source electrode $S_{P4}$ and the drain electrode $D_{P4}$ are not superimposed forms the channel area 15 which is the light-receiving portion.

In the optical sensor $30_4$, a light-shielding layer 22 of an area of the color filter substrate CF which opposes the channel area 15 is removed and, instead, for example, the color filter layer 23 of G(green) and the flattening film 25 are disposed. Then, when the channel area 15 is irradiated with the environmental light via the color filter layer 23, an output different from the first TFT optical sensor LS1 is obtained in the second TFT optical sensor LS2. The reason why G(green) color is used as the color filter layer 23 as described above is because the visibility of the green is higher than other colors, and the environmental light detected via the color filter layer 23 of G (green) is a result of detection which is close to the visibility of the user.

The light-detecting unit LD1 having the configuration as described above applies the constant inverted bias voltage GV (for example, −10V) from a voltage source to the gate electrodes $G_{P1}$ to $G_{P6}$ of the optical sensors $30_1$ to $30_6$ of the first and second TFT optical sensors LS1 and LS2 via a terminal T4 and a laid-around line L4 to achieve a gate off area. Then, The first reference voltage Vs is connected to one ends of the drain electrodes $D_{P1}$ to $D_{P6}$ and the capacitors $C_1$ to $C_6$ via the switch elements SW1 and SW2, and, one of the switch element SW1 and SW2 is turned ON and a predetermined voltage (for example, +2V) is applied to both ends of the capacitors $C_1$ to $C_3$ or the capacitors $C_4$ to $C_6$, and then the switch element SW1 or SW2 is turned OFF. Subsequently, when a predetermined time is elapsed, charged voltages of the capacitors $C_1$ to $C_3$ or $C_4$ to $C_6$ are outputted to output lines to supply the charged voltages to the detection circuit, so that the intensity of the environmental light is detected.

Referring now to FIG. 1 to FIG. 5, the respective lines wired on the chip-mounting area CA will be described. As shown in FIG. 1 and FIG. 5, the gate laid-around lines GL, the source laid-around lines SL, and the end of the common line Vcom are laid around on one of the long sides of the chip-mounting area CA. Then, the ends of laid-around lines for a flexible printed board (FPC) FL, which are to be connected to the FPC, not shown, are laid around on the other long side opposing the long side on which these lines are laid around. The ends of the lines laid around the respective long sides of the chip-mounting area CA are formed with terminals GB, SB, VB and FB to be connected to bump terminals (not shown) of the IC chip Dr respectively, and the terminals to be connected to the bump terminals are formed so as to be exposed on the surface, thereby being electrically connected to the bump terminals of the IC chip Dr via an anisotropic conductive adhesive agent or the like when the IC chip Dr is mounted on the chip-mounting area CA. In FIG. 5, the terminals GB, SB, VB and FB to be connected to the bump terminals are illustrated to be aligned in line along the long side of the chip-mounting area CA. However, they may be disposed in two columns alternately in such a manner that the adjacent terminals to be connected to the bump terminals are positioned on the different columns.

As described above, the respective lines laid around on the one long side of the chip-mounting area CA are laid around toward preset areas, respectively. More specifically, the source laid-around lines SL are laid around so as to be collected to a source laid-around area SA provided at a center portion on the one long side portion of the chip-mounting area CA, the gate laid-around lines GL are laid around so as to be collected to a gate laid-around area GA provided on both sides of the source laid-around area SA from the left and right, and the common line Vcom is laid around to a common laid-around area VA provided on further outside of the gate laid-around area GA.

Then, further leader lines are distributed from the terminals for the bump terminal GB, SB, and VB formed at the ends of the lines on the output side, that is, the gate laid-around lines GL, the source laid-around lines SL, and the common line Vcom, and the ends of the leader lines are formed with inspection terminals at a predetermined regularity. Structures of arrangement of the leader lines and the inspection terminals will be described below.

Source leader lines 40R, 40G, and 40B extend from the terminals SB to be connected to the bump terminals formed respectively at the ends of the plurality of source laid-around lines SL toward the inner side of the chip-mounting area CA. Ends of the source leader lines 40R, 40G, and 40B are formed with source inspection terminals 41R, 41G, and 41B. The lengths of the plurality of source leader lines 40R, 40G, and 40B are different. More specifically, from among the source leader lines 40R, 40G, and 40B, the source leader lines 40R connected to the data lines SW which send signals to pixels which display R(red) in the display area DA are the longest in comparison with the source leader lines 40G and 40B, and the source leader lines 40B connected to the data lines SW which send signals to pixels which display B(blue) in the display area DA are the shortest in comparison with the source leader lines 40R and 40G, and the remaining source leader lines 40G are formed to be shorter than the source leader lines 40R and longer than the source leader lines 40B. In this manner, by varying the lengths of the source leader lines 40R, 40G, and 40B, the source inspection terminals 41R, 41G, and 41B connected to the source leader lines 40R, 40G, and 40B are arranged in three columns in total by the data lines SW which display the pixels of the same color.

Gate leader lines 45P and 45S extend from the terminals GB to be connected to the bump terminals formed respectively at the ends of the plurality of gate laid-around lines GL toward the inner side of the chip-mounting area CA. Ends of the gate leader lines 45P and 45S are formed with gate inspection terminals 46P and 46S. The lengths of the plurality of gate leader lines 45P and 45S are different. More specifically, from among the gate leader lines 45P and 45S, the gate leader lines 45P connected to the odd ordinal numbered scanning lines GW are longer than the gate leader lines 45S, and in contrast, the gate leader lines 45S connected to the even ordinal numbered scanning lines GW are formed to be shorter than other gate leader lines 45P. In this manner, by varying the lengths of the gate leader lines 45P and 45S, the gate inspection terminals 46P and 46S connected to the gate leader lines 45P and 45S are arranged in two columns in total alternately between the odd ordinal numbered lines and the even ordinal numbered lines.

A common leader line 50 extends from the terminal for the bump terminal VB formed at the end of the common line Vcom toward the inner side of the chip-mounting area CA. An end of the common leader line 50 is formed with a common inspection terminal 51. The common inspection terminal 51 may be provided at a position which does not hinder the inspection of other terminals.

In addition to the configuration as described above, the liquid crystal display apparatus 1 in this embodiment is provided with a configuration for performing the intermediate functional inspection of the three laid-around lines L1 to L3 extending from the light-detecting unit LD1 as shown in FIG. 5. More specifically, the liquid crystal display apparatus 1 includes three sensor inspection lines 31 to 33 which are connected at one ends thereof to the terminals T1 to T3 to which the laid-around lines L1 to L3 are connected and are provided respectively at the other ends thereof with sensor inspection terminals 34 to 36.

The sensor inspection lines 31 to 33 extend from the terminals T1 to T3 toward the chip-mounting area CA, and the ends thereof extend to a sensor inspection line laid-around area PA formed between the source laid-around area SA and the gate laid-around area GA in the chip-mounting area CA. The sensor inspection terminals 34 to 36 provided at the ends of the three sensor inspection lines 31 to 33 are arranged at different positions. In other words, as shown in FIG. 5, the sensor inspection terminal 34 which is connected to the source electrodes $S_{P1}$ to $S_{P3}$ of the first optical sensor LS1 via the sensor inspection line 31, the terminal T1, and the laid-around line L1 is arranged on an extension of the column on which the source inspection terminals 41R are arranged, the sensor inspection terminal 35 which is connected to the drain electrodes $D_{P1}$ to $D_{P6}$ of the first and second optical sensors LS1 and LS2 via the sensor inspection line 32, the terminal T3, and the laid-around line L3 is formed on an extension of the column on which the source inspection terminals 41G are arranged, and the sensor inspection terminal 36 which is connected to the source electrodes $S_{P4}$ to $S_{P6}$ of the second optical sensor LS2 via the sensor inspection line 33, the terminal T2, and the laid-around line L2 is arranged on an extension of the column on which the source inspection terminals 41B are arranged.

In this manner, by arranging the plurality of sensor inspection terminals 34 to 36 on the same columns as the inspection terminals of other lines (for example, the source leader lines 41R, 41G, and 41B) arranged at different positions, a contact work with an inspection jig 70 (see FIG. 6) can be carried out at the same time during the intermediate functional inspection carried out later. Therefore, the inspection jig 70 used for the intermediate functional inspection of the liquid crystal display apparatus 1 having the configuration as described above and the method of inspection therewith will be described below. In FIG. 6, reference numerals of areas which correspond to respective conductive materials are provided so as to make the correspondence of the plurality of conductive materials of the inspection jig 70 to the area in the chip-mounting area CA understandable.

The inspection jig 70 used in the intermediate functional inspection of the liquid crystal display apparatus 1 in the embodiment is provided with the plurality of conductive materials on an insulative rubber 74 as shown in FIG. 6. Then, the intermediate functional inspection is carried out by applying predetermined voltages to the respective inspection terminals via the conductive materials. The conductive materials includes source contact members 71R, 71G, and 71B, gate contact members 72P and 72S, and common contact members 73.

The source contact members 71R, 71G and 71B are three band-shaped conductive materials arranged in parallel at a predetermined distance from each other. The three source contact members 71R, 71G and 71B are adjusted in position in such a manner that the source contact member 71R comes into contact with an area 61R where the source inspection terminals 41R are arranged in FIG. 5, the source contact member 71G comes into contact with an area 61G where the source inspection terminals 41G are arranged in FIG. 5, and the source contact member 71B comes into contact with an area 61B where the source inspection terminals 41B are arranged in FIG. 5. Then, the longitudinal lengths of the source contact members 71R, 71G and 71B are adjusted so as to cover the sensor inspection line laid-around area PA in addition to the source laid-around area SA, and hence the source contact members 71R, 71G and 71B come into contact also with the sensor inspection terminals 34 to 36.

The gate contact members 72P and 72S are two each, that is, four band-shaped conductive members in total arranged in parallel at a predetermined distance from each other at positions in the vicinity of the longitudinal both ends of the source contact members 71R, 71G, and 71B. The four gate contact members 72P and 72S are adjusted in position in such a manner that the gate contact members 72P come into contact with an area 62P where the odd ordinal numbered gate inspection terminals 46P are arranged in FIG. 5, and the gate contact members 72S come into contact with an area 62S where the even ordinal numbered gate inspection terminals 46S are arranged in FIG. 5. Furthermore, common contact members 73 are formed of rectangular conductive members disposed at positions in the vicinity of the outer ends of the gate contact members 72P and 72S in the longitudinal direction, respectively.

The intermediate functional inspection of the liquid crystal display apparatus 1 using the inspection jig 70 will be described below.

The intermediate functional inspection is carried out immediately before mounting the IC chip Dr on the chip-mounting area CA. First of all, the liquid crystal LC is encapsulated between the array substrate AR and the color filter substrate CF which are already formed with the lines and are bonded to each other so as to oppose to each other. Then, the inspection jig 70 is placed on the chip-mounting area CA. When placing the inspection jig 70, the respective conductive materials of the inspection jig 70 (the source contact members 71R, 71G and 71B, the gate contact members 72P and 72S, and the common contact members 73) are aligned with the conductive material contact areas (61R, 61G, 61B, 61P, 62S, and 63) in the chip-mounting area CA. By applying the predetermined voltage on the respective conductive materials of the inspection jig 70, the wiring inspection of the scanning lines GW, the data lines SW, and the common line Vcom is carried out.

When the inspection is ended, the functional inspection is carried out on the light-detecting unit LD1. More specifically, the first and second TFT optical sensors LS1 and LS2 are irradiated with a light which is adjusted in advance in a state in which a predetermined voltage, that is, the same voltage as the one supplied from the second reference voltage Vref, for example, is applied to the source contact member 71G. In this state, first of all, a predetermined voltage, that is, the same voltage as the one supplied from the first reference voltage Vs is applied to the source contact member 71R for a predetermined period, and the output from the first TFT optical sensor LS1 after having elapsed the predetermined period is detected. Then, the detected output and a logical value which is obtained in advance are compared, and whether or not the first TFT optical sensor LS1 is operated as desired is inspected. Subsequently, in the same process as the method of inspection of the first TFT optical sensor LS1, the inspection is carried out on the second TFT optical sensor LS2 by applying a predetermined voltage on the source contact member 71B and detecting the output from the second TFT optical sensor LS2.

In this manner, in the liquid crystal display apparatus 1 according to the embodiment of the invention, only by changing the voltage to be applied to the source contact members 71R, 71G and 71B, the intermediate functional inspection can be carried out on the light-detecting unit LD1 without replacing the inspection jig 70 or without changing the position to place during the intermediate functional inspection. Therefore, the process of the intermediate functional inspection can be simplified, and the functional inspection including the light-detecting unit LD1 can be carried out before mounting the expensive IC chip Dr on the chip-mounting area CA, so that the waste of the IC chip Dr is avoided.

In the liquid crystal display apparatus 1 according to the embodiment of the invention, the example in which the three laid-around lines L1 to L3 are laid around from the light-detecting unit LD1 has been described. However, the number of the laid-around lines is not limited to three lines, and two or four lines are also applicable. In the embodiment, the three laid-around lines L1 to L3 are formed on the same columns as the three types of source inspection terminals 41R, 41G, and 41B respectively. However, when the number of the laid-around lines is changed, they may be formed on the same column as other inspection terminal or, for example, the sensor inspection terminals 34 and 36 may be provided on the same column. In this manner, the positions of arrangement of the sensor inspection terminals may be changed as needed according to the number of the laid-around lines laid around from the light-detecting unit LD1 and the inspection process.

In the liquid crystal display apparatus 1 according to the embodiment of the invention, description has been made on the liquid crystal display apparatus 1 driven in the TN mode or the VA mode. However, the invention is not limited thereto, and the invention is also applicable to the liquid crystal display apparatus of an IPS (In-Plane Switching) mode or an FFS (Fringe Field Switching) mode in which the pixel electrodes and the common electrode are both formed on the array substrate AR. The entire disclosure of Japanese Patent Application No. 2008-035955, filed Feb. 18, 2008 is expressly incorporated by reference herein.

What is claimed is:

1. A liquid crystal display apparatus comprising:
a liquid crystal display panel having an array substrate having a plurality of scanning lines and data lines arranged in a matrix pattern and a chip-mounting area on which an IC chip for driving liquid crystal is provided and a color filter substrate having a color filter layer provided thereon;
a light-detecting unit having an optical sensor integrated in the liquid crystal display panel for detecting external light;
a detection circuit connected via sensor laid-around lines connected respectively to a plurality of lines of the light-detecting unit; an illuminating unit that illuminates the liquid crystal display panel; and
a control unit that controls the brightness of the illuminating unit on the basis of an output from the detection circuit;
wherein at least the plurality of data lines on the array substrate are distributed to the chip-mounting area and are formed with terminals for bump terminals to be connected to bump terminals of the IC chip at an end thereof, leader lines are further distributed from the plurality of the terminals to be connected to the bump terminals toward the chip-mounting area and are formed with inspection terminals at ends thereof, a plurality of sensor inspection lines each connected at one end thereof to each of the plurality of sensor laid-around lines and extended at the other end thereof to the chip-mounting area are formed, and the sensor inspection lines are each formed at the other end thereof with a sensor detection terminal.

2. The liquid crystal display apparatus according to claim 1, wherein the color filter layer formed on the color filter substrate includes a plurality of colors which are provided separately along the data lines, and the plurality of inspection terminals are arranged in a plurality of columns so as to be positioned in different columns by colors corresponding thereto, and the sensor inspection terminals formed at the other ends of the plurality of sensor inspection lines are disposed in the separate columns respectively.

3. The liquid crystal display apparatus according to claim 1, wherein the optical sensor in the light-detecting unit is a TFT optical sensor formed of a thin film transistor.

4. The liquid crystal display apparatus according to claim 3, wherein a plurality of the TFT optical sensors are provided and include first and second TFT optical sensors which detect lights in different systems.

* * * * *